United States Patent
Northcutt

(10) Patent No.: US 7,613,472 B2
(45) Date of Patent: Nov. 3, 2009

(54) SYSTEM AND METHOD OF SHARING A CONTACT LIST AMONG MOBILE PHONES

(75) Inventor: John W. Northcutt, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1143 days.

(21) Appl. No.: 10/605,240

(22) Filed: Sep. 17, 2003

(65) Prior Publication Data

US 2005/0059418 A1 Mar. 17, 2005

(51) Int. Cl.
*H04Q 7/20* (2006.01)

(52) U.S. Cl. .............. 455/466; 455/415; 455/412.1; 455/412.2; 455/414.1; 379/93.23

(58) Field of Classification Search .......... 455/466, 455/412.1, 414, 404.2, 558, 418, 556.1, 411, 455/419, 412.2, 415, 41, 517, 67.7, 414.2; 370/349, 352; 707/9; 705/1, 245; 709/245, 709/229, 206, 217; 379/93.23

See application file for complete search history.

(56) References Cited

U.S. PATENT DOCUMENTS

| | | | | |
|---|---|---|---|---|
| 5,464,087 | A * | 11/1995 | Bounds et al. ............ | 194/200 |
| 6,618,747 | B1 | 9/2003 | Flynn et al. | |
| 7,054,621 | B2 * | 5/2006 | Kennedy .................. | 455/416 |
| 7,120,455 | B1 * | 10/2006 | Chen et al. ................ | 455/466 |
| 7,133,687 | B1 * | 11/2006 | El-Fishawy et al. ........ | 455/466 |
| 7,187,932 | B1 * | 3/2007 | Barchi ....................... | 455/445 |
| 2001/0005859 | A1 * | 6/2001 | Okuyama et al. .......... | 709/245 |
| 2001/0021649 | A1 * | 9/2001 | Kinnunen et al. .......... | 455/412 |
| 2001/0024951 | A1 | 9/2001 | Rignell et al. | |
| 2001/0032240 | A1 * | 10/2001 | Malone et al. ............. | 709/203 |

(Continued)

FOREIGN PATENT DOCUMENTS

WO WO/99/29127 6/1999

(Continued)

OTHER PUBLICATIONS

International Search Report, PCT/IB2004/001060, Sony Ericsson Mobile Communications AB, Aug. 19, 2004.

(Continued)

*Primary Examiner*—Tan Trinh
(74) *Attorney, Agent, or Firm*—Frederick D. Bailey; Moore & Van Allen, PLLC

(57) ABSTRACT

A method of sending mobile phone contact list data from one mobile phone to another mobile phone is disclosed. The sender composes an SMS or MMS message having contact data from the mobile phonebook attached. The message is sent using a messaging service like SMS or MMS to other mobile phones in a group. Before receiving mobiles act on the message, a check is determined to see if the message contains contact list data. If it does not, the message is processed normally. If the message does contain contact list data, a software program is launched to manage the received contact list data. The program displays the received mobile phone contact list data so that the mobile phone user can examine the data. An import function is run to resolve conflicts, store and overwrite data into the mobile phone's contact database based on the newly received contact list data.

16 Claims, 3 Drawing Sheets

U.S. PATENT DOCUMENTS

| | | | |
|---|---|---|---|
| 2001/0047305 A1* | 11/2001 | Bowen, Jr. | 705/26 |
| 2002/0076015 A1* | 6/2002 | Norwitz et al. | 379/93.09 |
| 2002/0128047 A1* | 9/2002 | Gates | 455/566 |
| 2003/0078033 A1* | 4/2003 | Sauer et al. | 455/412 |
| 2003/0078981 A1* | 4/2003 | Harms et al. | 709/206 |
| 2003/0149834 A1* | 8/2003 | Susnjar | 711/112 |
| 2003/0236769 A1* | 12/2003 | Pyhalammi | 707/1 |
| 2004/0044536 A1* | 3/2004 | Fitzpatrick et al. | 705/1 |
| 2004/0076139 A1* | 4/2004 | Kang-Yeh et al. | 370/349 |
| 2004/0128151 A1* | 7/2004 | Mock et al. | 705/1 |
| 2004/0193601 A1* | 9/2004 | Hu et al. | 707/9 |
| 2004/0203381 A1* | 10/2004 | Cahn et al. | 455/41.2 |
| 2004/0203598 A1* | 10/2004 | Aerrabotu et al. | 455/411 |
| 2004/0203956 A1* | 10/2004 | Tsampalis | 455/466 |
| 2004/0203977 A1* | 10/2004 | Kennedy | 455/518 |
| 2004/0248597 A1* | 12/2004 | Mathis | 455/466 |
| 2004/0266397 A1* | 12/2004 | Smith et al. | 455/412.1 |
| 2005/0041793 A1* | 2/2005 | Fulton et al. | 379/211.01 |
| 2005/0228864 A1* | 10/2005 | Robertson | 709/206 |
| 2005/0288006 A1* | 12/2005 | Apfel | 455/418 |
| 2006/0031364 A1* | 2/2006 | Hamilton et al. | 709/206 |
| 2006/0031772 A1* | 2/2006 | Valeski | 715/751 |
| 2006/0271696 A1* | 11/2006 | Chen et al. | 709/229 |
| 2007/0276911 A1* | 11/2007 | Bhumkar et al. | 709/206 |
| 2008/0045265 A1* | 2/2008 | Yach et al. | 455/556.1 |

FOREIGN PATENT DOCUMENTS

| | | |
|---|---|---|
| WO | WO/01/44911 | 6/2001 |
| WO | WO/02/073992 A1 | 9/2002 |

OTHER PUBLICATIONS

International Search Report, PCT/IB2004/001060, Sony Ericsson Mobile Communications AB, Aug. 19, 2004.

Sony Ericsson Mobile Communications, AB, *International Application Ser. No. PCT/IB2004/001060*, "International Preliminary Report on Patentability", Oct. 7, 2005.

Samsung Electronics Co Ltd., *Japanese Patent Abstract XP002290689*, "Method for Transmitting and Receiving Phone Book Content as Short Message Service in Mobile Communication Terminal", Jun. 28, 2002.

* cited by examiner

SYSTEM AND METHOD OF SHARING A CONTACT LIST AMONG MOBILE PHONES

BACKGROUND OF INVENTION

One of the characteristics of most mobile phones is its ability to store numerous contacts in an internal contact database or on a SIM card or both. The contact data base is often referred to as a "phonebook" and comprises contact information that you would typically find in larger PDA and computer applications such as Microsoft Outlook™. The phone book can accommodate fields such as name, address, multiple telephone numbers, multiple e-mail addresses, and the like. Mobile phone users routinely make use of the phonebook function for convenience. The phonebook function is even more convenient when it can be paired with or "synchronized" with a contact database on a computer. This eliminates the need to individually key in contact data for each entry in the phonebook which can be prohibitively time consuming using the mobile phone's keypad.

Typically, a mobile phone user will have multiple groups of contacts in his database. Groups can be organized by family, friends, work team members, professional acquaintances, emergency contacts, etc. Often a need arises to share a common list of contacts among a group. One group member may maintain a contact list for the entire group and update it periodically. When updates occur, the rest of the group needs to update their mobile phone contact list also to make sure that everyone has the latest contact data. Unfortunately there has not been a simple straightforward mechanism for updating the contacts on a group of mobile phones without requiring each member of the group to key in the new contact data themselves.

What is needed is a mechanism that allows groups of mobile phone users that share common contacts to effortlessly update their respective contact lists without each user having to key in the new contact data.

SUMMARY OF INVENTION

The present invention describes a method of sending mobile phone contact list data from one mobile phone using a mobile phone messaging service to other mobile phones eliminating the need to re-key individual contact data. The sender composes an SMS or MMS message that will have contact data from his phonebook attached. The sender displays his contact list and selects the contacts he wishes to attach to the message. Once the message has been composed it is sent using a messaging service like SMS or MMS to other mobiles wanting the updated contact data. Prior to sending the message, the sender may preview the message so that additional contacts can be added to the message and/or selected contacts can be deleted. In addition, individual contact data can be displayed for a selected contact prior to adding the contact to the message.

There is also described a method of receiving mobile phone contact list data in a mobile phone that was sent from a second mobile phone using a mobile phone messaging service. A message is received in the mobile phone from the second mobile phone. Before acting on the message, a check is determined to see if the message contains contact list data. If it does not, the message is processed as it normally would be by the mobile phone. If the message does contain contact list data, however, an application specific software program is launched to manage the received contact list data. The program displays the received mobile phone contact list data so that the mobile phone user can examine the data. An import function is run to resolve conflicts, store and overwrite data into the mobile phone's contact database based on the newly received contact list data.

There is also described a method of uploading a mobile phone contact list from a mobile phone to a computer server residing on a digital cellular network (DCN). The mobile phone user selects one or more contacts on the mobile phone to be uploaded to the computer server. Next, a connection is established between the mobile phone and the computer server. The contact list data from the mobile phone is uploaded to the computer server and stored for later retrieval. The server then automatically composes and sends an SMS or MMS message to mobile users named in the contact list data informing them that new contact list data is available for download. Alternatively, the mobile user that posted the new contact list data can separately send an SMS or MMS message to the rest of the group informing them of the recent posting on the server.

To retrieve the uploaded contact list data, a mobile phone establishes a connection with the computer server and, upon proper authentication, is given permission to download the contact list data from the computer server to the mobile phone. Once the contact list data has been downloaded to the mobile phone, a software program is launched to manage the new contact list data. The new contact list data is then previewed and stored on the mobile phone.

DETAILED DESCRIPTION

Figure 1:
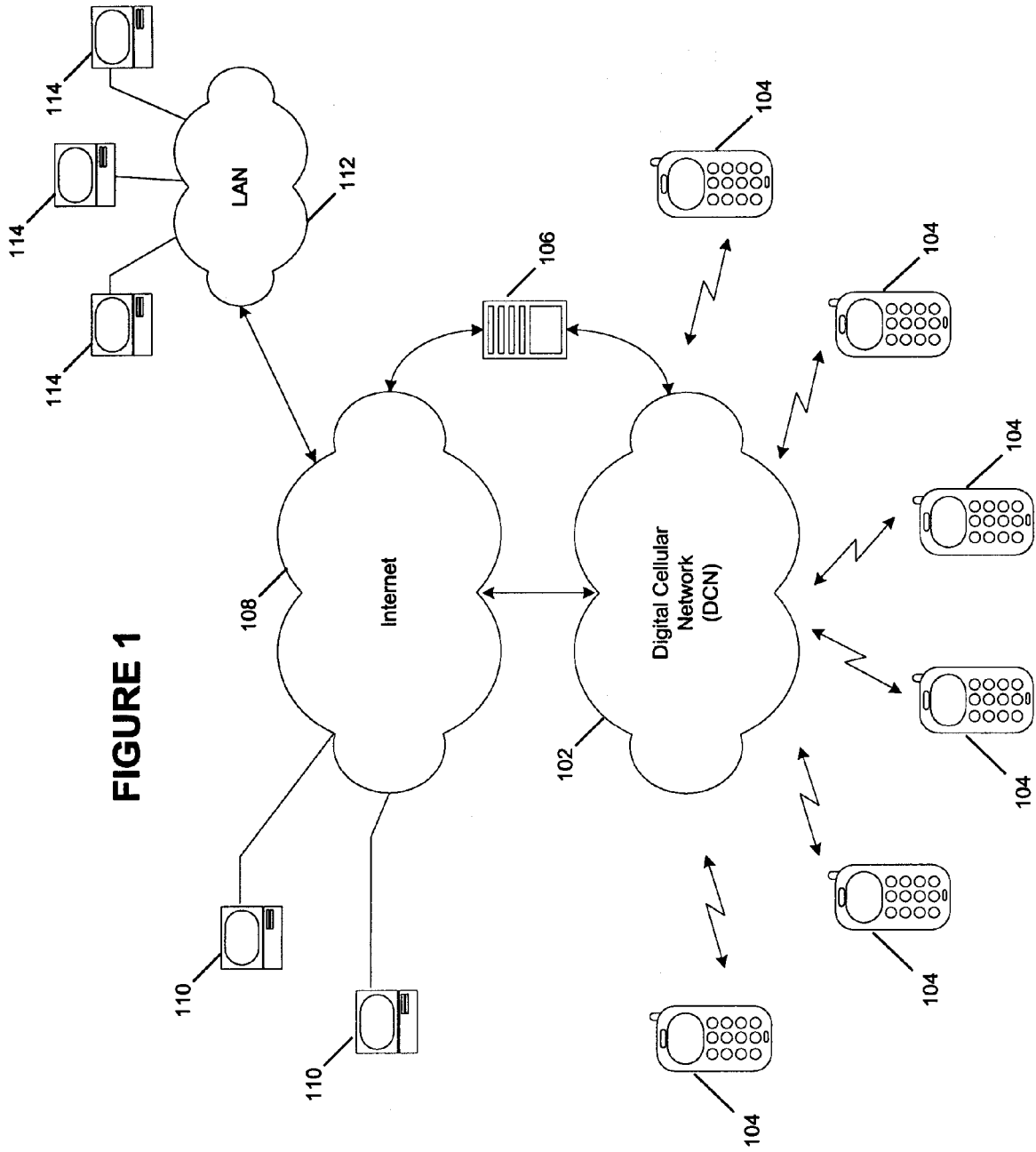
FIG. 1 illustrates a hardware environment in which the present invention can be implemented.

FIG. 1 illustrates a hardware environment in which the present invention can be implemented. A digital cellular network (DCN) 102 is responsible for providing a voice and data communications network for a plurality of mobile phones 104. A server 106 is coupled with the DCN 102. While not shown, it is understood that the server 106 also contains or is operatively coupled with storage device(s) so that data pertaining to applications and/or subscribers may be stored. The server is maintained by the owner of the DCN and contains applications and data to be used and accessed by subscribers to the DCN. Subscribers, in this context, are the same as mobile phones 104 and mobile phone users. As such, the terms may be used interchangeably throughout this description.

Both the DCN 102 and the server 106 are also coupled with the Internet 108 to provide greater access to data and content exchanges for the benefit of the subscribers. The Internet 108, in turn, can be coupled to a variety of other computers, computer like devices, and even other computer networks. In FIG. 1, the Internet 108 is shown coupled with some personal computers (PCs) 110 and a local area network (LAN) 112. The LAN can represent a company's internal computer network that has a connection to the Internet 108. Similar to the Internet 108, LAN 112 can be coupled with other computers 114, computer like devices, and other computer networks.

A computer 110, 114 or mobile phone 104 user has a limited ability to access, write to, and read from server 106 for purposes of uploading or downloading data pertinent to applications running on the server. Access to server 106 is permitted provided a computer 110, 114 or mobile phone 104 user has proper authorization and can validate themselves to server 106.

The network architecture described in FIG. 1 provides a basis for implementing software and software applications in the mobile phones 104 that facilitate the creation and dissemination of contact list data among groups of mobile phone 104 users.

The present invention envisions two separate embodiments for sharing a mobile phone contact list. The first is based on existing mobile phone messaging protocols used in a peer-to-peer manner. The second is based on access to a centralized server that mobile phone and/or computer users can upload to and download from.

If a computer is involved in the process of sharing or creating a mobile phone contact list, then it is assumed that the computer is capable of communication with a mobile phone. This is ubiquitous today and is sometimes referred to as "synchronizing" the computer with the mobile phone. Data such as contact lists can be stored and edited in a computer as well as a mobile phone. Periodically, the user synchronizes the data between the computer and the mobile phone. 'Syncing' entails establishing a direct connection (wired or wireless) between a computer and a mobile phone and reconciling differences between a contact list file on the mobile phone and a corresponding contact list file on a computer. Software allows the user to select which list shall be given preference to overwrite the other with detected differences.

Moreover, many computers are capable of sending and receiving SMS and MMS messages that are in a mobile phone format or protocol. Such a crossover is relatively simple since the data protocols for the computer and the mobile phone are typically both packet based protocols. Software residing on a computer can read and decode SMS or MMS messages without much difficulty. Thus, a computer can be used as a surrogate for a mobile phone provided the computer and mobile phone can 'sync' with one another.

Figure 2:
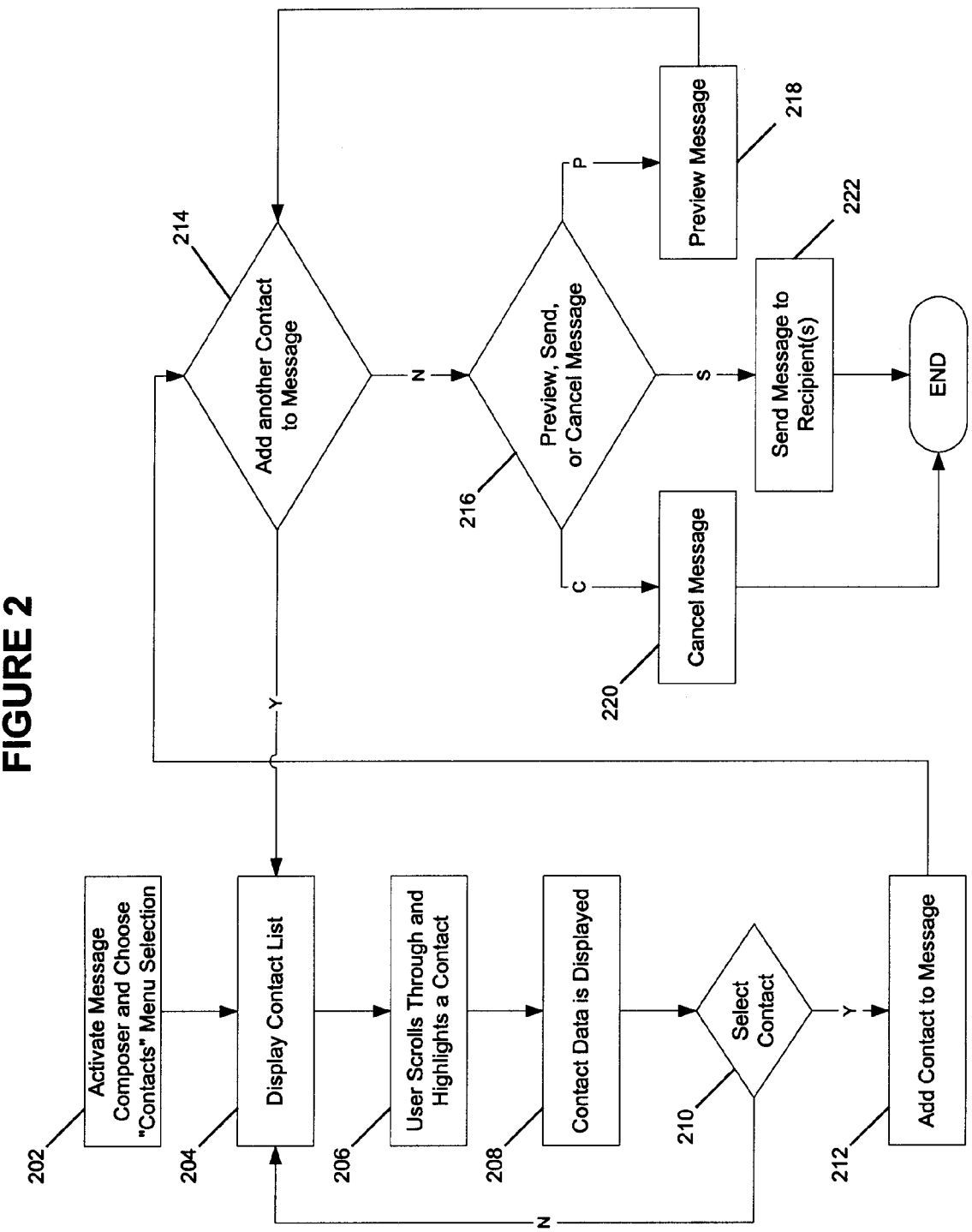
FIG. 2 is a flow chart describing how a mobile phone user creates and sends an SMS or MMS message containing contact list data to a group of mobile phones.

FIG. 2 is a flow chart describing how a mobile phone user creates and sends an SMS or MMS message containing a contact list to a group of mobile phones. This is the peer-to-peer methodology alluded to above. When a user wishes to share a subset of his mobile phone contacts with a group of other mobile phone users, he can create an SMS or MMS message containing the pertinent contacts to be sent to the group. A group may comprise, for instance, a set of mobile phone users that work together on a project, or set of mobile phone users that make up a softball team. Generally, a group is comprised of mobile phone users that share a common interest and frequently correspond with one another.

To create a contact list for group dissemination, a mobile phone user accesses the message composer function of his mobile phone and selects the contacts icon or its equivalent 202. This action will display all of the mobile phone contacts in the mobile phone 204. Using the user interface (UI) the user can scroll through the list and highlight an individual contact that he may wish to add to the message 206. When a contact is highlighted the screen displays all of the information for that contact that is stored in memory 208. At this point, the user decides whether to include this contact in the message 210. If not, the individual contact data is cleared from the display and the entire contact list is re-displayed 204 from the point where it was interrupted. If the user does select to include this contact in the message, then the contact data is added to the message 212 and the user is prompted whether he wishes to add another contact to the message 214. If another contact is to be added to the message, then the contact list is re-displayed 204 from the point where it was interrupted and the process repeats until all desired contacts have been added to the message. Once the message is complete, the user can preview, cancel, or send the message to its intended recipients 216. Previewing the message 218 entails perusing the contacts associated with the message. The user is provided a final opportunity to edit the list he just created including removing or adding contacts. Canceling the message 220 allows the user to abort the message composing function altogether. Sending the message 222 involves the user designating recipients of the just created SMS or MMS message and sending the message to the group using the appropriate communication means.

The contact list message just created is different from other SMS or MMS messages in that it contains control data identifying the message as containing a contact list. When this control data is received and decoded by the recipient mobile phone, software in the mobile phone initiates a contacts import function. It also alerts the sending mobile phone to format the message data so that it can be easily processed by the receiving applications.

For example, mobile 1 creates a contact list and sends it to mobile 2 via an MMS message. Mobile 2 receives and decodes the message control data and the phone displays New Contact Data or an equivalent. If the message control data does not indicate that the message contains contacts then the message is handled as it normally would be. Otherwise, when mobile 2 opens the message, the message composer compares the existing contact list database to see if the new message contains new contacts and/or differences to existing contacts. Mobile 2 then previews the sent contact list and individually selects new contacts and/or overwrites existing contacts. Additionally, mobile 2 could accept the contact list completely without individual review.

Figure 4:
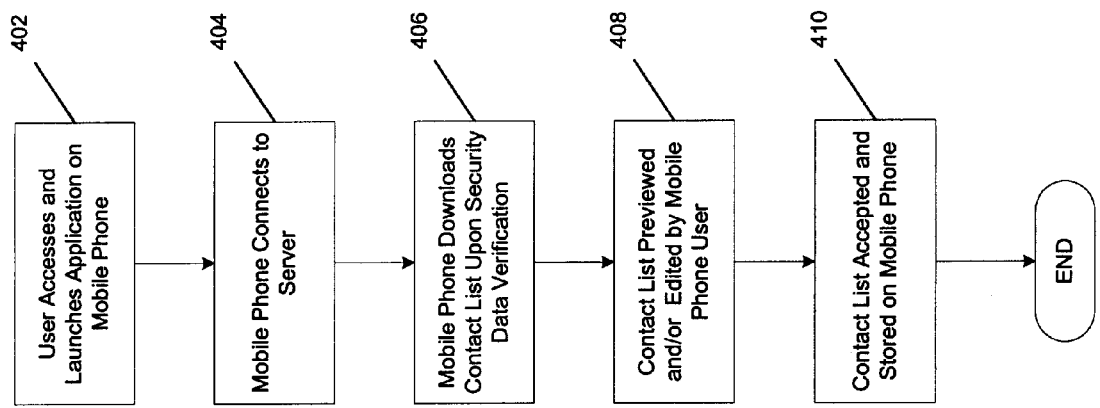
FIG. 4 is a flowchart describing how a mobile phone user downloads contact list data from a server.
Figure 3:
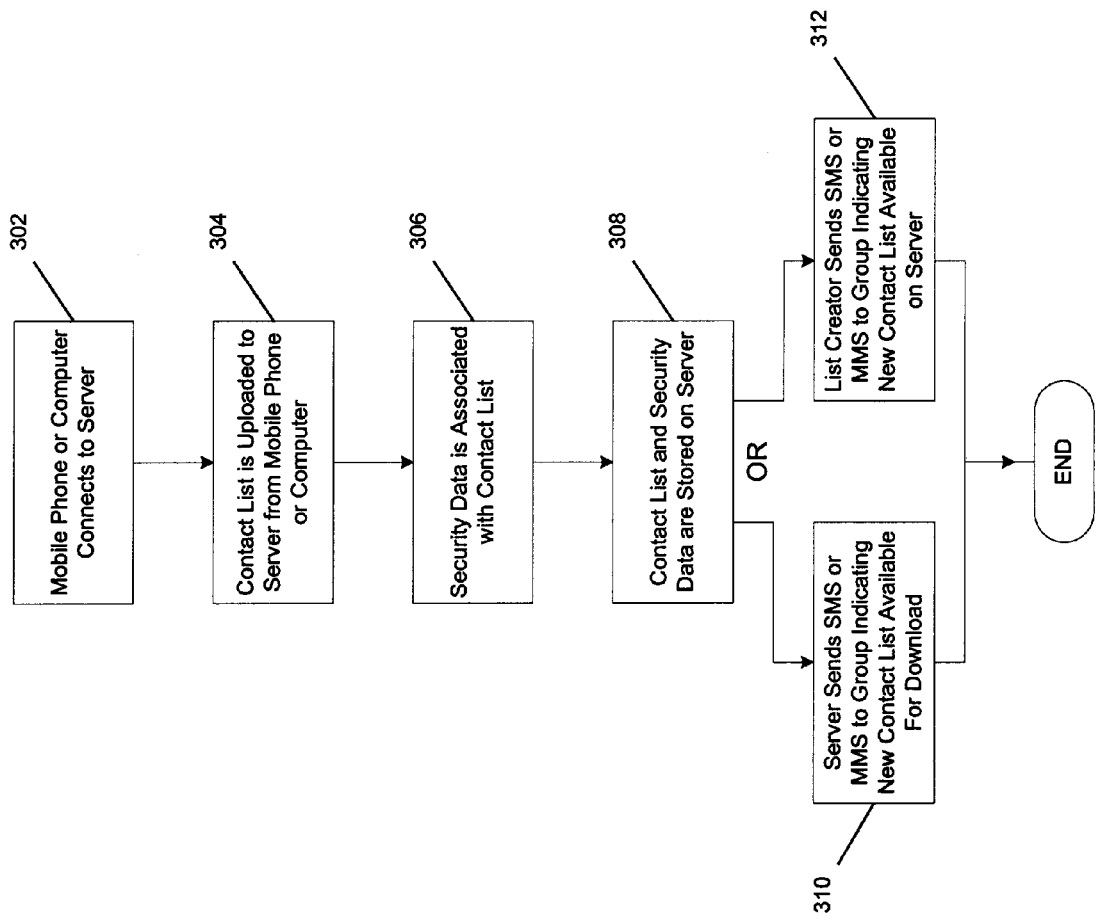
FIG. 3 is a flowchart describing how a mobile phone user uploads a contact list to a server.

FIGS. 3 and 4 describe the process of uploading and downloading a mobile phone contact list from a server maintained by the DCN operator.

FIG. 3 is a flowchart describing how a mobile phone user or computer user uploads a contact list to a server that can be accessed by other users in a group. To upload data to the server maintained by the DCN operator, a user must be authorized for access. Access is typically granted to network subscribers. Since the server is coupled with the DCN it can be accessed directly by a mobile phone. It is also possible to access the server via a computer over the Internet provided the server is communicable with the Internet. For purposes of illustration, mobile phone uploading to the server is described.

A mobile phone user having a valid subscription with the DCN navigates his mobile phone menu structure to initiate a connection 302 with server on the DCN. The format and protocol of the connection is not necessarily important so long as it supports packet data transfers. Upon establishing a connection 302, the mobile transfers or uploads a contact list from his mobile to the server 304.

The contact list can comprise the entire set of contacts on the mobile phone or a user-defined subset of contacts. To define a subset of contacts, the user first displays a contact list via a user interface and software to carry out such a task. While navigating the displayed contact list, the user can select which contacts are to be uploaded to the server. Once the user has navigated the list and selected the contacts to be uploaded, the contacts are marked by the software to be included in the subsequent upload procedure.

As an extra security measure the contact list can be associated with security data 306 such as a password. This ensures that the contact list is downloadable only by mobile group members on the contact list that have the password. The contact list and security data are then stored on the server 308.

At this point a message is broadcast to the group indicating that a new contact list is available on the server for download. The broadcast message can be created and sent by the server 310 since the contact list constitutes the group members. The server could issue an SMS or MMS message to the group that includes the access password. Alternatively, the mobile user that uploaded the list could send an SMS or MMS message to the rest of the group indicating that he has just posted an updated contact list 312 that can be downloaded from the server. The security data can be given in this broadcast message.

FIG. 4 is a flowchart describing how a mobile phone user downloads a contact list from a server. Once the contact list has been uploaded to the server and the group members have been notified of its existence, individual group members can download the updated or new contact list at their convenience. To download a new contact list, a mobile user launches an application specific software program running on his mobile 402. The software program initially establishes a connection between the mobile and the server 404. If required, security data is exchanged and the mobile is allowed to download the contact list 406 from the server. Upon receipt of the contact list into the mobile phone, the software program opens the list for inspection by the user. The contact list can be previewed, and/or edited by the user 408. Once the user has reviewed the contact list to their satisfaction, it can be stored on the mobile phone 410. Data in the new contact list that conflicts with data already existing in the mobile phone will be overwritten. New data will simply be entered into the phonebook/contact database of the mobile phone.

The security measures need not be password related. Other means for verifying the identity of a mobile user attempting to download a contact list may be employed. For instance, since each mobile is uniquely identifiable to the DCN, the server can verify the identity of the mobile upon connection to the server without requiring a password entry.

In addition, the present invention can be implemented in a variety of mobile messaging settings including, but not limited to, short messaging service (SMS), multi-media messaging service (MMS), and mobile e-mail services. Those of ordinary skill in the art can readily adapt the concepts set forth in the present invention to a variety of messaging platforms.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, or transport the program for use by or in connection with the instruction execution system, apparatus, or device. The computer-usable or computer-readable medium may be, for example but not limited to, an electronic, magnetic, optical, electromagnetic, or semiconductor system, apparatus, or device. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The invention claimed is:

1. A method of sending a mobile phone contact list from a first mobile phone using a mobile phone messaging service to a group of mobile phones comprising:
    displaying the mobile phone contact list of the first mobile phone;
    selecting one or more contacts from the mobile phone contact list;
    adding contact data for the selected contacts from the mobile phone contact list to a message; and
    sending the message containing the contact data for the selected contacts to the group of mobile phones using the mobile phone messaging service, the message containing control data identifying the message as containing a contact list.

2. The method of claim 1 wherein the mobile phone messaging service uses a short messaging service (SMS) format.

3. The method of claim 1 wherein the mobile phone messaging service uses a multi-media messaging service (MMS) format.

4. The method of claim 1 further comprising previewing the message prior to sending the message so that contact data for additional contacts can be added to the message and selected contacts can be deleted.

5. The method of claim 1 further comprising displaying the contact data for a selected contact prior to adding the contact to the message.

6. A computer readable medium with instructions stored therein for sending a mobile phone contact list from a first mobile phone to a group of other mobile phones using a mobile phone messaging service, the instructions when executed by a processing device causing the processing device to perform:
    displaying the mobile phone contact list of the first mobile phone;
    selecting one or more contacts from the mobile phone contact list;
    adding contact data for the selected contacts from the mobile phone contact list to a message; and
    sending the message containing the contact data for the selected contacts to the group of other mobile phones using the mobile phone messaging service, the message containing control data identifying the message as containing a contact list.

7. The computer readable medium of claim 6 wherein the mobile phone messaging service uses a short messaging service (SMS) format.

8. The computer readable medium of claim 6 wherein the mobile phone messaging service uses a multi-media messaging service (MMS) format.

9. The computer readable medium of claim 6 further comprising computer program code for previewing the message prior to sending the message so that additional contacts can be added to the message and selected contacts can be deleted.

10. The computer readable medium of claim 6 further comprising computer program code for displaying the contact data for a selected contact prior to adding the contact to the message.

11. A method of receiving data for a mobile phone contact list in a first mobile phone sent from a second mobile phone using a mobile phone messaging service comprising:
- receiving a message in the first mobile phone from the second mobile phone using the mobile phone messaging service;
- determining whether the received message contains data for a contact list and, if so launching a application specific software program to manage the received data for a contact list, otherwise handling the received message normally;
- displaying the received data for a contact list;
- resolving contact list data conflicts between the received data for a contact list and contact data already stored on the first mobile phone; and
- storing the received data for a contact list in a contact list of the first mobile phone.

12. The method of claim 11 wherein the mobile phone messaging service uses a short messaging service (SMS) format.

13. The method of claim 11 wherein the mobile phone messaging service uses a multi-media messaging service (MMS) format.

14. A computer readable medium with instructions stored therein for receiving data for a mobile phone contact list in a first mobile phone sent from a second mobile phone using a mobile phone messaging service, the instructions when executed by a processing device causing the processing device to perform:
- receiving a message in the first mobile phone from the second mobile phone using the mobile phone messaging service;
- determining whether the received message contains data for a contact list and, if so launching a application specific software program to manage the received data for a contact list, otherwise handling the received message normally;
- displaying the received data for a contact list;
- resolving contact list data conflicts between the received data for a contact list and contact data already stored on the first mobile phone; and
- storing the received data for a contact list in a contact list of the first mobile phone.

15. The computer readable medium of claim 14 wherein the mobile phone messaging service uses a short messaging service (SMS) format.

16. The computer readable medium of claim 14 wherein the mobile phone messaging service uses a multi-media messaging service (MMS) format.

* * * * *

UNITED STATES PATENT AND TRADEMARK OFFICE
CERTIFICATE OF CORRECTION

| | | |
|---|---|---|
| PATENT NO. | : 7,613,472 B2 | Page 1 of 1 |
| APPLICATION NO. | : 10/605240 | |
| DATED | : November 3, 2009 | |
| INVENTOR(S) | : John W. Northcutt | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1724 days.

Signed and Sealed this

Nineteenth Day of October, 2010

David J. Kappos
*Director of the United States Patent and Trademark Office*